Patented Apr. 12, 1932

1,853,083

UNITED STATES PATENT OFFICE

GUSTAV REDDELIEN, OF LEIPZIG, AND HANS LANGE, OF DESSAU IN ANHALT, GERMANY, ASSIGNORS TO WINTHROP CHEMICAL COMPANY, INC., OF NEW YORK, N. Y., A CORPORATION OF NEW YORK

MANUFACTURE OF 6'-CHLORO-6-METHYL-1.2.3.4-TETRAHYDRONAPHTHALENE

No Drawing. Application filed July 15, 1930, Serial No. 468,206, and in Germany July 29, 1929.

Our present invention relates to the manufacture of 6'-chloro-6-methyl-1.2.3.4-tetrahydronaphthalene of the formula

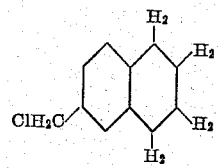

According to our invention, 1.2.3.4-tetrahydronaphthalene is transformed into its 6'-chloro-6-methyl derivative of the formula given above in a simple manner and with a good yield by treating it in the presence of water with molecular formaldehyde and concentrated hydrochloric acid while stirring and cautiously heating the reaction mixture. Preferably, the concentration of acid is maintained at the desired degree by simultaneously introducing gaseous hydrogen chloride during the reaction. We prefer to carry out our new process at a temperature of about 60° C. to 70° C.; under these working conditions good yields are easily obtainable. However, the reaction temperature may be varied within certain limits and good results even are obtainable at temperatures between 40 to 100° C.

The 6'-chloro-6-methyl-1.2.3.4-tetrahydronaphthalene is a valuable intermediate product, for instance, in the manufacture of synthetic dyes or odoriferous substances.

The following example illustrates the invention without limiting it, the parts being by weight:

792 parts of 1.2.3.4-tetrahydronaphthalene are introduced into a mixture of 750 parts of an aqueous solution of formaldehyde of 30 per cent strength and 3000 parts of concentrated hydrochloric acid. The mixture is heated to 60° C. to 65° C. while stirring and introducing hydrogen chloride. After several hours the oil is separated from the hydrochloric acid, washed until neutral, dried and distilled in a vacuum. Thus 702 parts of 6'-chloro-6-methylnaphthalene-tetrahydride-1.2.3.4 are obtained, boiling between 139° C. and 141° C. under 11 mm. pressure of mercury. For technical purposes the crude oil obtained may, of course, be directly used.

By a cautious oxidation process our new compound is transformed into 1.2.3.4-tetrahydro-6-naphthaldehyde.

What we claim is:

1. The process which comprises acting with formaldehyde upon 1.2.3.4-tetrahydronaphthalene in the presence of water and of concentrated hydrochloric acid.

2. The process which comprises acting with formaldehyde upon 1.2.3.4-tetrahydronaphthalene in the presence of water and of concentrated hydrochloric acid at a temperature of about 40 to 100° C. while stirring the reaction mixture.

3. The process which comprises acting with formaldehyde upon 1.2.3.4-tetrahydronaphthalene in the presence of water and of concentrated hydrochloric acid at a temperature of about 60 to 70° C. while stirring the reaction mixture and while introducing gaseous hydrogen chloride.

4. The process which comprises suspending 792 parts of 1.2.3.4-tetrahydronaphthalene in 750 parts of an aqueous solution of formaldehyde of 30 per cent strength and 3000 parts of concentrated hydrochloric acid, heating the mixture to 60 to 70° C. while stirring and introducing hydrogen chloride.

5. As a new product 6'-chloro-6-methyl-1.2.3.4-tetrahydronaphthalene of the formula

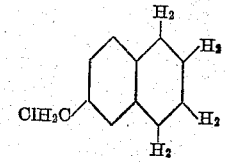

forming at room temperature a quite colorless oil, boiling between 139° C. and 141° C. under 11 mm. pressure of mercury and yielding by a cautious oxidation process 1.2.3.4-tetrahydro-6-naphthaldehyde.

In testimony whereof, we affix our signatures.

GUSTAV REDDELIEN.
HANS LANGE.